(12) United States Patent
Buchanan et al.

(10) Patent No.: US 12,443,984 B2
(45) Date of Patent: Oct. 14, 2025

(54) SYSTEMS AND METHODS FOR MATCHING ENTITIES

(71) Applicant: Xero Limited, Wellington (NZ)

(72) Inventors: Duncan Buchanan, Wellington (NZ); Han Zhang, Wellington (NZ); Shreyas Nagarajappa, Wellington (NZ); Rui Min, Wellington (NZ); William Lester, Wellington (NZ); Mehika Manocha, Wellington (NZ)

(73) Assignee: Xero Limited, Wellington (NZ)

( * ) Notice: Subject to any disclaimer, the term of this patent is extended or adjusted under 35 U.S.C. 154(b) by 195 days.

(21) Appl. No.: 18/028,423

(22) PCT Filed: Aug. 25, 2021

(86) PCT No.: PCT/NZ2021/050153
§ 371 (c)(1),
(2) Date: Mar. 24, 2023

(87) PCT Pub. No.: WO2022/131932
PCT Pub. Date: Jun. 23, 2022

(65) Prior Publication Data
US 2023/0368267 A1    Nov. 16, 2023

(30) Foreign Application Priority Data

Dec. 17, 2020 (AU) .............................. 2020904715

(51) Int. Cl.
*G06Q 30/00* (2023.01)
*G06Q 30/0601* (2023.01)

(52) U.S. Cl.
CPC .............................. *G06Q 30/0631* (2013.01)

(58) Field of Classification Search
CPC ............... G06Q 30/00; G06Q 30/0601; G06Q 30/0623; G06Q 30/0641
See application file for complete search history.

(56) References Cited

U.S. PATENT DOCUMENTS 9,031,866 B1 *  5/2015  Ng .................... G06Q 30/0255
                                                    705/26.1
10,902,484 B1 *  1/2021  Pepere ................ G06Q 20/145
(Continued)

OTHER PUBLICATIONS

Entity search techniques (Year: 2017).*
(Continued)

*Primary Examiner* — Christopher B Seibert
(74) *Attorney, Agent, or Firm* — Young Basile Hanlon & MacFarlane, P.C.

(57) ABSTRACT

A method comprises identifying a candidate entity for matching with one or more target entities from a plurality of target entities, and for one or more of the target entities: determining a target suitability measure indicative of a suitability of the target entity to the candidate entity based on desired target entity attributes of the candidate entity and corresponding one or more target entity attributes associated with the target entity; determining a candidate suitability measure indicative of a suitability of the candidate entity to the target entity based on one or more desired candidate entity attributes of the target entity and corresponding one or more candidate entity attributes associated with the candidate entity; determining a matching score for the candidate entity and target entity pair as a first function of the target suitability measure and the candidate suitability measure; and. determining suggested target entities for matching with the candidate entity.

19 Claims, 6 Drawing Sheets

| Candidate Entity Attribute Data ||||| Target Entity #N Attribute Data |||||
|---|---|---|---|---|---|---|---|---|---|
| Candidate Entity || Desired Target Entity ||| Target Entity #1 || Desired Candidate Entity |||
| Candidate Entity Attribute Type | Candidate Entity Attributes | Desired Target Entity Attribute Type | Desired Target Entity Attributes | Weights | Target Entity Attribute Type | Target Entity Attributes | Desired Candidate Entity Attribute Type | Desired Candidate Entity Attributes | Weights |
| Industry | CA1 | Industry | $CA_{DT}1$ | $CW_{DT}1$ | Industry | $T_NA1$ | Industry | $T_NA_{DC}1$ | $T_NW_{DC}1$ |
| Location #1 | CA2 | Location #1 | $CA_{DT}2$ | $CW_{DT}2$ | Location #1 | $T_NA2$ | Location #1 | $T_NA_{DC}2$ | $T_NW_{DC}2$ |
| Turnover | CA3 | Location #2 | $CA_{DT}3$ | $CW_{DT}3$ | Location #2 | $T_NA3$ | Turnover | $T_NA_{DC}3$ | $T_NW_{DC}3$ |
| Size | CA4 | Stage/ experience | $CA_{DT}4$ | $CW_{DT}4$ | Stage/ experience of business | $T_NA4$ | Size of business | $T_NA_{DC}4$ | $T_NW_{DC}4$ |
| Work type | CA5 | Technical experience | $CA_{DT}5$ | $CW_{DT}5$ | Technical experience | $T_NA5$ | Type of work | $T_NA_{DC}5$ | $T_NW_{DC}5$ |
| Business type | CA6 | Accreditation | $CA_{DT}6$ | $CW_{DT}6$ | Accreditation | $T_NA6$ | Type of business | $T_NA_{DC}6$ | $T_NW_{DC}6$ |

(56) References Cited

U.S. PATENT DOCUMENTS

| | | | |
|---|---|---|---|
| 2002/0128910 A1 | 9/2002 | Sakuma | |
| 2003/0182413 A1* | 9/2003 | Allen | H04L 12/145 709/223 |
| 2004/0093259 A1 | 5/2004 | Pych | |
| 2005/0080656 A1* | 4/2005 | Crow | G06Q 10/1053 705/7.14 |
| 2006/0020783 A1 | 1/2006 | Fisher | |
| 2007/0211651 A1* | 9/2007 | Ahmed | H04L 67/104 370/256 |
| 2008/0126146 A1 | 5/2008 | Benveniste et al. | |
| 2009/0178048 A1* | 7/2009 | Branson | G06Q 10/00 718/104 |
| 2011/0137785 A1* | 6/2011 | Lutnick | G06Q 40/04 705/37 |
| 2011/0137786 A1* | 6/2011 | Lutnick | G06Q 40/04 705/37 |
| 2011/0246308 A1 | 10/2011 | Segall et al. | |
| 2011/0251889 A1* | 10/2011 | Simard | G06Q 30/0247 705/14.46 |
| 2012/0005062 A1* | 1/2012 | Lutnick | G06Q 40/06 705/37 |
| 2012/0016761 A1* | 1/2012 | Najm | G06Q 30/06 705/26.1 |
| 2012/0253834 A1* | 10/2012 | Tracy | G16H 10/60 705/2 |
| 2013/0018879 A1 | 1/2013 | McConnell et al. | |
| 2013/0144775 A1* | 6/2013 | Ross | G06Q 40/04 705/37 |
| 2013/0332336 A1* | 12/2013 | Hardy | G06Q 40/02 705/38 |
| 2014/0019327 A1* | 1/2014 | Lutnick | G06Q 40/04 705/37 |
| 2014/0149251 A1* | 5/2014 | Stockwell | G06Q 30/0613 705/26.35 |
| 2014/0222832 A1* | 8/2014 | Weill | G16B 40/00 707/748 |
| 2014/0289033 A1* | 9/2014 | Ortigoza | G06Q 50/01 705/14.27 |
| 2014/0330845 A1* | 11/2014 | Feldschuh | G06F 16/215 707/749 |
| 2015/0081390 A1* | 3/2015 | Brereton | G06Q 30/0204 705/7.33 |
| 2015/0180971 A1* | 6/2015 | Varney | G06F 15/177 709/204 |
| 2015/0213385 A1* | 7/2015 | Moloney | G06Q 10/06315 705/7.25 |
| 2015/0293976 A1* | 10/2015 | Guo | G06N 3/045 707/706 |
| 2016/0004764 A1* | 1/2016 | Chakerian | G06F 40/106 707/737 |
| 2016/0117325 A1* | 4/2016 | Gallé | G06F 16/367 707/749 |
| 2016/0275786 A1* | 9/2016 | Fowe | G08G 1/0141 |
| 2016/0358255 A1* | 12/2016 | Tilly | G06Q 30/08 |
| 2017/0048244 A1* | 2/2017 | Loughlin-McHugh | G06V 40/171 |
| 2017/0061382 A1* | 3/2017 | Zhang | G06Q 10/1053 |
| 2018/0039647 A1* | 2/2018 | Winstanley | G06F 16/9535 |
| 2019/0354596 A1* | 11/2019 | Mirylenka | G06F 16/215 |
| 2020/0242133 A1* | 7/2020 | Stoilos | G06F 16/285 |
| 2020/0327600 A1* | 10/2020 | Yilmazcoban | G06Q 50/01 |
| 2020/0406906 A1* | 12/2020 | Omari | G05D 1/0223 |
| 2021/0149963 A1* | 5/2021 | Agarwal | G06F 16/90332 |
| 2021/0248149 A1* | 8/2021 | Somani | G06F 40/30 |
| 2021/0326940 A1* | 10/2021 | Serna | G06Q 30/016 |
| 2021/0375428 A1* | 12/2021 | Neumann | G16H 20/60 |
| 2022/0300570 A1* | 9/2022 | Ostadzadeh | G06F 16/9537 |

OTHER PUBLICATIONS

Di Modica, Giuseppe, and Orazio Tomarchio. "Matching the business perspectives of providers and customers in future cloud markets." Cluster Computing 18 (2015): 457-475. (Year: 2015).*

* cited by examiner

Candidate Entity Attribute Data

| Candidate Entity | | Desired Target Entity | | Weights |
|---|---|---|---|---|
| Candidate Entity Attribute Type | Candidate Entity Attributes | Desired Target Entity Attribute Type | Desired Target Entity Attributes | |
| Industry | CA1 | Industry | $CA_{DT}1$ | $CW_{DT}1$ |
| Location #1 | CA2 | Location #1 | $CA_{DT}2$ | $CW_{DT}2$ |
| Turnover | CA3 | Location #2 | $CA_{DT}3$ | $CW_{DT}3$ |
| Size | CA4 | Stage/experience | $CA_{DT}4$ | $CW_{DT}4$ |
| Work type | CA5 | Technical experience | $CA_{DT}5$ | $CW_{DT}5$ |
| Business type | CA6 | Accreditation | $CA_{DT}6$ | $CW_{DT}6$ |

Figure 1A

Target Entity #N Attribute Data

| Target Entity #1 | | Desired Candidate Entity | | Weights |
|---|---|---|---|---|
| Target Entity Attribute Type | Target Entity Attributes | Desired Candidate Entity Attribute Type | Desired Candidate Entity Attributes | |
| Industry | $T_NA1$ | Industry | $T_NA_{DC}1$ | $T_NW_{DC}1$ |
| Location #1 | $T_NA2$ | Location #1 | $T_NA_{DC}2$ | $T_NW_{DC}2$ |
| Location #2 | $T_NA3$ | Turnover | $T_NA_{DC}3$ | $T_NW_{DC}3$ |
| Stage/experience of business | $T_NA4$ | Size of business | $T_NA_{DC}4$ | $T_NW_{DC}4$ |
| Technical experience | $T_NA5$ | Type of work | $T_NA_{DC}5$ | $T_NW_{DC}5$ |
| Accreditation | $T_NA6$ | Type of business | $T_NA_{DC}6$ | $T_NW_{DC}6$ |

Figure 1B

Let us find an advisor for you

We'll help you find the right advisor for you business. Only the first two fields are required, but the more information you give us, the better your match will be.

Email address

Full name

Contact number

Business name

Country
Australia

City

Industry

Olivia
Bell

Harvey Consulting
Sydney, Australia

806 Practice overview
804 Get in touch

Experienced supporting businesses like you based on 802
Industry ———
Location ———
Business stage ———
Accounting services ———
Apps and software ———
Orig, size and structure ———
Revenue and turnover ———

Cameron
Fox

Wollongong, Australia
City, Country

806 Practice overview
804 Get in touch

Experienced supporting businesses like you based on 802
Industry ———
Location ———
Business stage ———
Accounting services ———
Apps and software ———
Orig, size and structure ———
Revenue and turnover ———

Figure 8

SYSTEMS AND METHODS FOR MATCHING ENTITIES

CROSS-REFERENCE TO RELATED APPLICATION(S)

This application is a 371 national phase application of International Application Serial No. PCT/NZ2021/050153, filed Aug. 25, 2021, which claims priority to and the benefit of Australian Patent Application Serial No. 2020904715, filed Dec. 17, 2020, the entire disclosures of which are hereby incorporated by reference.

TECHNICAL FIELD

Described embodiments relate to systems, computer-implemented methods and computer programs for determining one or more suggested target entities for matching with a candidate entity.

BACKGROUND

Knowing your customer, both individuals and organisations, allows businesses to tailor services and experiences to suit their customers' needs and tastes. Similarly, for customers seeking to select a particular service provider, knowledge of key areas of specialisation of possible service providers can assist customers in selecting an appropriately qualified service provider. Such knowledge can be inferred from data collected about the customers or service providers. However, interpreting the data to provide meaningful suggestions or recommendations to customers or service providers can be complicated and time consuming, particularly when a large volume of the data is involved.

Any discussion of documents, acts, materials, devices, articles or the like which has been included in the present specification is not to be taken as an admission that any or all of these matters form part of the prior art base or were common general knowledge in the field relevant to the present disclosure as it existed before the priority date of each claim of this application.

SUMMARY

Some embodiments relate to a computer-implemented method comprising: identifying a candidate entity for matching with one or more target entities from a plurality of target entities; for one or more of the target entities: determining a target suitability measure indicative of a suitability of the target entity to the candidate entity based on one or more desired target entity attributes of the candidate entity and corresponding one or more target entity attributes associated with the target entity; determining a candidate suitability measure indicative of a suitability of the candidate entity to the target entity based on one or more desired candidate entity attributes of the target entity and corresponding one or more candidate entity attributes associated with the candidate entity; and determining a matching score for the candidate entity and target entity pair as a first function of the target suitability measure and the candidate suitability measure; and determining one or more suggested target entities for matching with the candidate entity based on the matching score for each candidate entity and target entity pair.

In some embodiments, the method may further comprise: for each one of the one or more target entities: identifying one or more contacts associated with the target entity; determining one or more contact attributes of the identified one or more contacts; and determining the one or more target entity attributes associated with the target entity based on the determined one or more contact attributes of the identified one or more contacts.

Some embodiments relate to a computer-implemented method comprising: identifying a candidate entity for matching with one or more target entities from a plurality of target entities; for one or more of the target entities: identifying one or more contacts associated with the target entity; determining one or more contact attributes of the identified one or more contacts; determining the one or more target entity attributes associated with the target entity based on the determined one or more contact attributes of the identified one or more contacts; determining a target suitability measure indicative of a suitability of the target entity to the candidate entity based on one or more desired target entity attributes of the candidate entity and corresponding one or more target entity attributes of the one or more target entity attributes associated with the target entity; determining a matching score for the candidate entity and target entity pair as a first function of the target suitability measure; and determining one or more suggested target entities for matching with the candidate entity based on the matching score for each candidate entity and target entity pair.

In some embodiments, the method may further comprise: for the one or more of the target entities: determining a candidate suitability measure indicative of a suitability of the candidate entity to the target entity based on one or more desired candidate entity attributes of the target entity and corresponding one or more candidate entity attributes associated with the candidate entity; and determining the matching score for the candidate entity and target entity pair as the first function of the target suitability measure and the candidate suitability measure.

The method may comprise determining the one or more candidate entity attributes associated with the candidate entity from a database of an accounting platform system, the accounting platform system being configured to maintain accounting records for the candidate entity.

In some embodiments, determining the candidate suitability measure may comprise: determining one or more candidate suitability values for each of one or more candidate entity attribute types, wherein the one or more candidate suitability values are metrics of the one or more desired candidate entity attributes of the one or more candidate entity attribute types relative to respective one or more candidate entity attributes of corresponding candidate entity attribute types; and determining the candidate suitability measure as a second function of the one or more target suitability values. The method may further comprise: for each one of the one or more target entities: determining a target entity weight for each of the one or more candidate entity attribute types, the target entity weight being indicative of the relative importance to the target entity of candidate entity attribute type in a candidate entity; weighting each of the one or more candidate suitability values of the by the respective one or more target entity weights; and determining the candidate suitability measure as the second function of the weighted candidate suitability values.

In some embodiments, determining the candidate suitability measure may comprise: determining one or more candidate suitability scores for each of one or more candidate entity attribute values, wherein the one or more candidate suitability scores are indicative of a rank of the candidate entity attribute value relative to candidate entity attribute values of corresponding candidate entity attribute associated with others of the plurality of target entities; and determining the candidate suitability measure as a third function of the one or more candidate suitability scores. The method may further comprise: for each one of the one or more target entities: determining a target entity weight for each of the one or more candidate entity attribute types, the target entity weight being indicative of the relative importance to the target entity of candidate entity attribute type in a candidate entity; weighting each of the one or more candidate suitability scores of the by the respective one or more target entity weights; and determining the candidate suitability measure as the second function of the weighted candidate suitability scores. The candidate suitability value may be a metric based at least in part on a density estimation value associated with a set of contacts of the target entity, and a number of contacts in the set.

In some embodiments, the method further comprises: for each of the one or more target entities: determining the one or more desired candidate entity attributes based on corresponding contact attributes of the identified one or more contacts. In some embodiments, the method comprises receiving, from a user interface of a computing device associated with the one or more target entities, the desired candidate entity attributes.

Determining the target suitability measure may comprise: determining one or more target suitability values for each of one or more target entity attribute types, wherein the one or more target suitability values are metrics of the one or more target entity attributes of target entity attribute types relative to the one or more desired target entity attributes of the one or more corresponding target entity attribute types; and determining the target suitability measure as a third function of the one or more target suitability values.

In some embodiments, the method comprises: determining a candidate entity weight for each of the one or more target entity attribute types, the candidate entity weight being indicative of the relative importance to the candidate entity of the target entity attribute type in a target entity; for each one of the one or more target entities: weighting each of the one or more target suitability values by a respective one or more candidate entity weights; and determining the target suitability measure as the third function of the weighted target suitability values.

In some embodiments, determining the target suitability measure may comprise: determining one or more target suitability scores for each of one or more target entity attribute values, wherein the one or more target suitability scores are indicative of a rank of the target entity attribute value relative to target entity attribute values of corresponding target entity attributes associated with others of the plurality of target entities; and determining the target suitability measure as a third function of the one or more target suitability scores.

In some embodiments, the method comprises: for each one of the one or more target entities: determining a candidate entity weight for each of the one or more target entity attribute types, the candidate entity weight being indicative of the relative importance to the target entity of target entity attribute type in a target entity; weighting each of the one or more target suitability scores of the by the respective one or more candidate entity weights; and determining the target suitability measure as the second function of the weighted target suitability scores. The target suitability value may be a metric based at least in part on a density estimation value associated with a set of contacts of the target entity, and a number of contacts in the set.

The method may comprise: receiving, from a user interface of a computing device associated with the candidate entity, the desired target entity attributes. The one or more desired target entity attributes for the one or more respective target entity attribute types may be derived from candidate entity attributes of candidate entity attribute type corresponding to the one or more respective target entity attribute type. The one or more candidate entity attributes are indicative of respective one or more candidate entity attributes types and the one or more target entity attributes are indicative of respective one or more target entity attributes types.

The one or more target entity attribute types may comprise one or more of: (i) industry; (ii) location; (iii) experience with a particular type of business; (iv) experience with a particular type of technology; (v) certification or authorisation; (vi) experience with stage of business; and (vii) experience with type of work. The one or more candidate entity attribute types may comprise one or more of: (i) location; (ii) turnover; (iii) size of business; (iv) number of staff; (v) type of business; (vi) stage of business; (vii) experience with a particular type of technology; and (viii) type of work candidate entity is likely to need assistance with.

In some embodiments, the method may comprise: determining an ordered list of the of one or more matching scores; and determining from the ordered list, the one or more suggested target entities for matching with the candidate entity. The method may further comprise sending to a computing device associated with the candidate entity, the one or more suggested target entities. The method may further comprise displaying, on a user interface associated with the candidate entity, the one or more suggested target entities. The method may comprise sending to a computing device associated with a respective one of the one or more suggested target entities, a notification identifying the candidate entity.

Some embodiments relate to a system comprising: one or more processors; and memory comprising computer executable instructions, which when executed by the one or more processors, cause the system to perform any one of the described methods.

Some embodiments relate to a computer-readable storage medium storing instructions that, when executed by a computer, cause the computer to perform any one of the described methods (e.g., a non-transitory computer-readable storage medium storing instructions that, when executed by a computer, cause the computer to perform operations corresponding to any one of the described methods).

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

BRIEF DESCRIPTION OF DRAWINGS

Embodiments of the present disclosure will now be described by way of non-limiting example only with reference to the accompanying drawings, in which:

FIG. 1A is a table showing example candidate entity attribute data;

FIG. 1B is a table showing example target entity attribute data;

FIG. 7 is an example first user interface object displayed on a user interface of a computing device of a candidate entity, the first user interface object configured to elicit desired target entity attributes; and FIG. 8 is an example second user interface object displayed on a user interface of a computing device of a candidate entity, the second user interface object displaying suggested target entities for a candidate entity.

DESCRIPTION OF EMBODIMENTS

Figure 2:
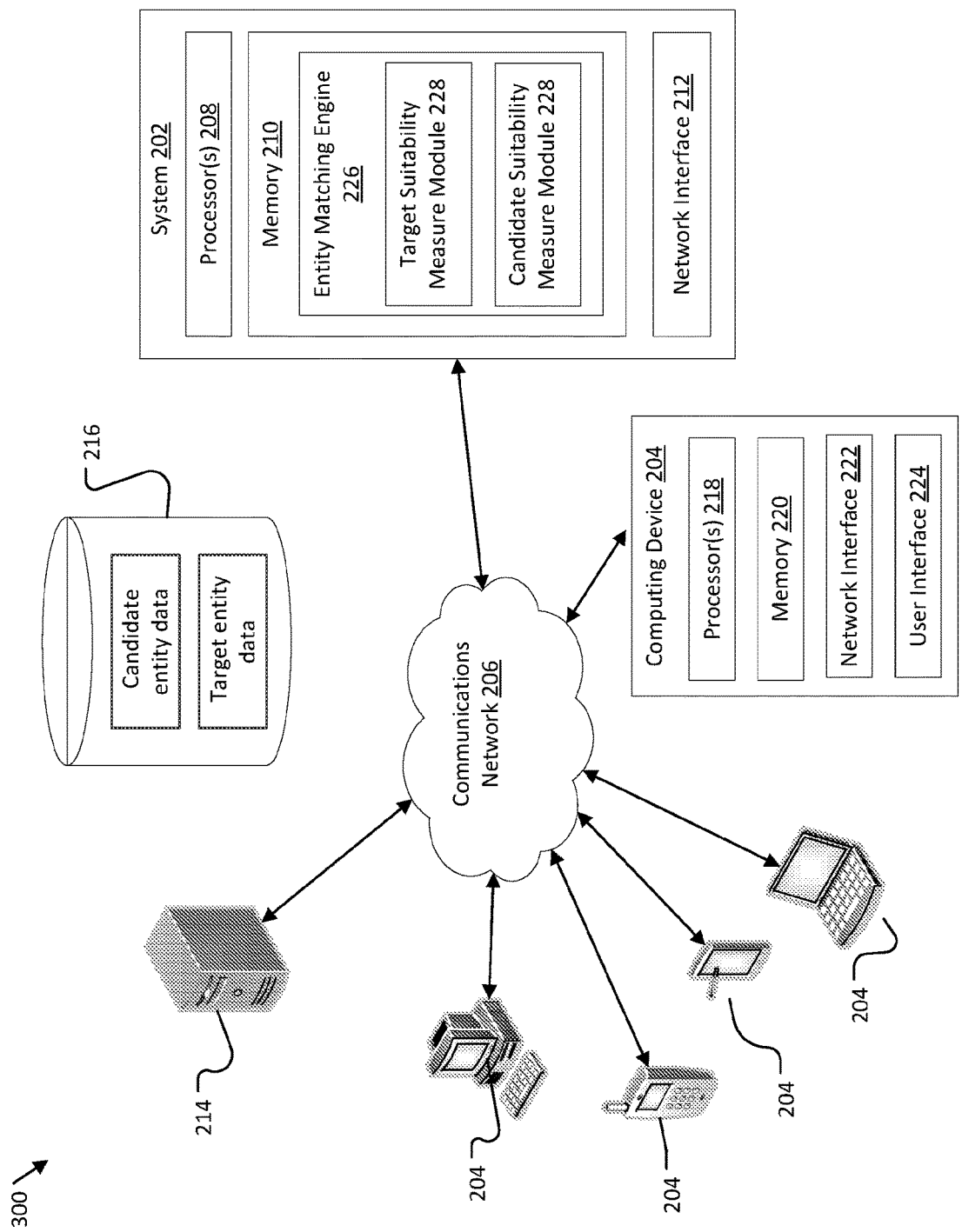
FIG. 2 is a block diagram of a system comprising a system in communication with one or more computing device across a communication network, according to some embodiments.

Described embodiments relate to systems, computer-implemented methods and computer programs for determining one or more suggested target entities for matching with a candidate entity.

The one or more target entities may be service or service provider entities. That is, the one or more target entities may be in the business of providing services to entities such as candidate entities as partners or advisors. Examples of target entities may include individuals, businesses, companies, organisations, non-for profits, governmental bodies and/or organisations, telecommunications companies and/or organizations, accountants, accounting firms or companies, legal professionals, law firms or companies, engineering professionals, engineering firms or companies, management consultants, management consulting firms or companies, medical professionals and medical firms or companies (e.g. hospitals, medical clinics).

The one or more candidate entities may be clients or potential clients of service providers, such as the target entities. Examples of candidate entities may include individuals, businesses, companies, organisations, non-for profits, governmental bodies and/or organisations, telecommunications companies and/or organizations, accountants, accounting firms or companies, legal professionals, law firms or companies, engineering professionals, engineering firms or companies, management consultants, management consulting firms or companies, medical professionals and medical firms or companies (e.g. hospitals, medical clinics).

In some embodiments, a system, such as an accounting system providing an accounting platform service, may be configured to match candidate entities with recommended or suggested target entities from a plurality of target entities. The system may be configured to maintain information about entities in a network of entities, each entity being associated with a network of at least one other entity. For example, a first entity may be associated with or connected with a plurality of second entities, which may be service providers, suppliers or advisors to the first entity, and a plurality of third entities, which may be clients or customers of the first entity and/or the second entity. By maintaining data, such as account information for the first entity, and potentially maintaining data, such as account information for one or more of the second and/or third entities, the system has access to data about the first entity and its network of contacts. This information may be used by the system to determine and/or infer attributes of the first entity, and/or its contacts, such as key areas of specialisation or expertise. For example, the system may determine that a majority of the third entities connected to the first entity are businesses in a particular industry, such as hospitality, and may therefore infer that the first entity specialises in providing services to the hospitality industry. The system may avail of entity information, and in some embodiments, network data associated with the entity, to determine suitable matches between candidate entities and target entities with which to match the candidate entities. The ability of the system to determine and/or infer specialist areas or expertise of target entities allows the system to generate improved, more informed, matching suggestions that are based on historical records and/or actual work experience of the target entity, as opposed to merely target entity indicated expertise.

In some embodiments, a matching score for one or more candidate entity and target entity pairs is determined. The matching score may depend on a suitability of the target entity to the candidate entity. In some embodiments, the matching score may depend on a suitability of the target entity to the candidate entity as well as the suitability of the target entity to the candidate entity. By taking a bidirectional approach to matching, i.e., considering both the suitability of the target entity to the candidate entity and the candidate entity to the target entity, improved matching suggestions may be determined that are more likely to result in an engagement of the candidate entity and target entity, as the preferences, suitability, specialisation and/or needs of both the candidate entity and target entity are being taken into consideration.

Matching scores for multiple candidate entity and target entity pairs may be determined. One or more suggested target entities from the multiple pairs may be presented to the candidate entity as recommendations for the candidate entity to engage or connect with. In some embodiments, suggested target entities may be organisations, businesses or firms, and/or individual practitioners or service providers in one or more of organisations, businesses or firms, or sole practitioner or service providers. For example, it may be the case that a majority of practitioners in an accounting firm have expertise with start-up business and few have any experience with liquidating businesses. As opposed to the accounting firm, and its practitioners as a whole, being selected as a suggested target entity or suggested target entities, any person or persons in the accounting firm with expertise with liquidating businesses may be identified and provided as suggested target entities.

The potential combinations of the number of potential target entities for any given candidate entity, the number of possible entity attributes associated with those target entities, the number of possible entity attributes specifically desired by a candidate entity, and/or the number of contacts of potential target entities means that the dataset to be interrogated to determine one or more suggested target entities for a particular candidate entity can be extreme and computationally resource intensive. However, the proposed approach provides a simple, elegant solution to multivariate optimisation that is both time-efficient and computationally inexpensive, while providing improved quality suggestions for matching entities. Furthermore, it offers flexibility to candidate entities in determining attributes of importance to them in a potential target entity, allowing weightings to be applied to balance competing requirements.

In some embodiments, the system may be configured to determine candidate entity and/or target entity attribute data, such as the candidate entity attribute data shown in FIG. 1A and the target entity attribute data shown in FIG. 1B, to determine the suitability of a candidate entity to a particular target entity, and vice versa.

As illustrated in the table of FIG. 1A, the candidate entity attribute data may comprise data associated specifically with the candidate entity, which is depicted as candidate entity attribute and is associated with particular candidate entity attribute types. The examples of candidate entity attribute types provided in this example include: "Industry", "Location", "Turnover", "Size", "Work Type", and "Business Type". For example, "Industry" may be the industry type of the candidate entity, "Location" may be the geolocation of the street address of the candidate entity, "Turnover" may be an amount of revenue or a revenue band level of revenue generated by the candidate, "Size" may be the number of staff of the candidate entity, "Work Type" may be the particular type of work the candidate entity is likely to need assistance with, for example payroll matters, and "Business Type" may be the type of business the candidate entity is, such as a partnership or a sole trader. It will be appreciated that these candidate entity attribute types are examples only and any suitable candidate entity attribute types may be used. The column "Candidate Entity Attribute" indicates attributes for each of these candidate entity attribute types, namely CA1 to CA6. Examples of attributes may be CA1=hospitality; CA2=Melbourne; CA3=AUD2,000,000; CA4=25 staff; CA5=Payroll; and CA6=Sole proprietor.

In some embodiments, attributes for one or more of the candidate entity attribute types may be determined from data, such as account information, of the candidate entity that may be stored by and accessible to the system. For example, the "Industry", "Location", "Size", and "Business Type" may be attributes that an organisation or entity provides when signing up for or creating an account with the system, such as an accounting system. Other attributes, such as "Turnover", or other financial data attributes, may be determined from accounting data the system maintains for the candidate entity, such as the annualised revenue band, annualised revenue amount, year-on-year revenue change etc. "Work Type" may be derived or inferred from particular functionality or applications that are enabled or used by the candidate entity, such as the Payroll function. In some embodiments, such data may be retrievable or received by the system from a third party system or server, for example. Accordingly, the candidate entity attributes for the candidate entity attribute types may be derived from information input by a user associated with a candidate entity, from user interactions with functionality and/or applications provided by the system, from data obtained from a third party system, data or records maintained by the system on behalf of the candidate entity, which may for example, be financial data or records maintained by an accounting system.

The candidate entity attribute data of FIG. 1A further depicts desired target entity data, including desired target entity attribute types, desired target entity attribute and candidate entity weights. The desired target entity attribute types are the types of attributes that are relevant or important for consideration when matching the candidate entity to a target entity, in some embodiments. In particular, at least some of the desired target entity attribute types are attributes that are indicative of expertise and/or specialisation of a target entity, and may be referred to as target entity speciality attribute types. In some embodiments, one or more of the desired target entity attribute types are indicative of desired entity attributes of contacts or clients of the target entity, which may thereby indicate the specialisation or expertise of the target entity. The examples of desired target entity attribute types provided in this example include: "Industry", "Location #1", "Location #2", "Stage/experience", "Technical experience", and "Accreditation", and these are associated with respective desired target entity attributes $CA_{DT}1$ to $CA_{DT}6$. For example, "Industry" may be the industry type the candidate entity would like a target entity to have experience in. "Location #1" may be one or more geolocations of street addresses, or an representative geolocation indicative of desired location(s) of a target entity's office(s). "Location #2" may be one or more geolocations of street addresses, or an representative geolocation indicative of desired location(s) of businesses or organisations a target entity has experience working with. "Stage/experience" may be a stage or level of business that a candidate entity considers it desirable for a target entity to have experience with, for example, a start-up business, early years of a business (e.g., 2-3 years on), or shutdown/liquidate. "Technical experience" may be a level of technical experience, for example with particular applications and/or software, that a candidate entity considers it desirable for a target entity to have experience with. "Accreditation" may be indicative of a certification or authorisation or accreditation that a candidate entity considers it desirable for a target entity to have, such as advisor certified, or payroll certified.

In some embodiments, candidate entity weightings or weights may be applied to the one or more desired target entity attributes to ensure that certain desired target entity attributes types are given more weight or importance than other desired target entity attributes types. In the example of FIG. 1B, the weights allocated to desired target entity attribute types "Industry", "Location #1", "Location #2", "Stage/experience", "Technical experience", and "Accreditation" are $CW_{DT}1$ to $CW_{DT}6$, respectively. The candidate entity weights may be candidate entity specific or may be general weights used as weights for matching multiple candidate entities with target entities. In some embodiments, the weights are user defined, that is defined by a user associated with the candidate entity. The weights may be adjusted automatically or by a user to modify the matching criteria with a view to determining a different set of suggested targets. In some embodiments, weightings may be determined from information derived from surveys of candidate and/or target type entities. In some embodiments, historical records of successful and/or unsuccessful matches between candidate entities and target entities may be analysed to determine optimal weightings for the candidate entity weights.

FIG. 1B is a table of example target entity attribute data. The target entity attribute data may comprise data associated with a target entity, which is depicted as target entity attributes and is associated with particular target entity attribute types. The target entity attributes may be indicative of expertise or speciality of a target entity. Similar to the desired target entity attribute types of the candidate entity date, the examples of target entity attribute types provided in this example include: "Industry", "Location #1", "Location #2", "Stage/experience", "Technical experience", and "Accreditation". For example, "Industry" may be the industry type the target entity has experience in. "Location #1" may be one or more geolocations of street addresses, or an representative geolocation indicative of location(s) of the target entity's office(s). "Location #2" may be one or more geolocations of street addresses, or an representative geolocation indicative of location(s) of businesses or organisations the target entity has experience working with. "Stage/experience" may be a stage or level of business that the target entity has experience with. "Technical experience" may be a level of technical experience, for example with particular applications and/or software, that the target entity has experience with. "Accreditation" may be indicative of a certification or authorisation or accreditation that the target entity has.

In some embodiments, a set or plurality of target entity attributes may be associated with a given target entity attribute type, with each of the plurality of target entity attributes being associated with a metric. For example, where the target entity attribute type is "Industry", the plurality of target entity attributes may include "hospitality", "mining" and "childcare", and each of these target entity attributes may be associated with a metric indicative of the experience the target entity has in each industry. Similarly, where the target entity attribute type is "Location #2", the plurality of target entity attributes may include multiple core hubs or "hot spots" in which clients of a target entity are based and each of these target entity attributes may be associated with a metric indicative of the experience the target entity has working with businesses in those locations.

In some embodiments, attributes for one or more of the target entity attribute types may be determined from information of the target entity that may be stored by and accessible to the system. For example, "Location #1" may be an attribute that an organisation or entity provides when signing up for or creating an account with the system, such as an accounting system. Other attributes, such as "Industry", "Location #2", "Stage/experience", "Technical experience", and "Accreditation" may be derived from specific information provided by a user associated with the target entity to indicate areas of expertise or specialisation, and which may be stored by the system, for example, in a target entity account. In some embodiments, one or more of attributes of target entity attribute types may be derived from information associated with or attributes of contacts (such as clients or customers) of the target entity within the system network of contacts. In other words, the expertise or specialisation of a target entity may be inferred from the attributes of contacts (or a subset of contacts) of the target entity; if the target entity has a number of clients in a particular industry, it can be inferred that the target entity has experience servicing clients in that industry.

The target entity attribute data of FIG. 1B further depicts desired candidate entity data, including desired candidate entity attribute types, desired candidate entity attributes and target entity weights. The desired candidate entity attribute types are the types of attributes that are relevant or important for consideration when matching the candidate entity to a target entity, in some embodiments. For example, it may be beneficial to ensure that a candidate entity with which a particular target entity is to be matched is the type of candidate entity that the particular target is interested in working with. Similar to the examples of candidate entity attributes of the candidate entity data, examples of desired candidate entity attribute types provided in FIG. 1B include: "Industry", "Location", "Turnover", "Size", "Work Type", and "Business Type". Similar to the target entity attributes, the desired candidate entity attributes may be determined from account information of the target entity (for example, a target entity may prefer a candidate entity to be in the same geographical location as the target entity itself), may determine desired candidate entity attributes from a user associated with the target entity, and/or may determine or infer preferences from entity attributes of current and prior contacts (for example, contacts classified or identified as clients).

In some embodiments, target entity weightings or weights may be applied to the one or more desired candidate entity attributes to ensure that certain desired candidate entity attributes types are given more weight or importance than other desired candidate entity attributes types. The target entity weights may be target entity specific or may be general weights used as weights for matching multiple candidate entities with target entities. In some embodiments, the weights are user defined, that is defined by a user associated with the target entity. The weights may be adjusted automatically or by a user to modify the matching criteria with a view to determining a different set of suggested targets. In some embodiments, weightings may be determined from information derived from surveys of candidate and/or target type entities. In some embodiments, historical records of successful and/or unsuccessful matches between candidate entities and target entities may be analysed to determine optimal weightings for the target entity weights.

FIG. 2 is a schematic of a communications system 200 comprising a system 202 in communications with one or more computing devices 204 across a communications network 206. For example, the system 202 may be an accounting system. Examples of a suitable communications network 310 include a cloud server network, wired or wireless internet connection, Bluetooth™ or other near field radio communication, and/or physical media such as USB.

The system 202 comprises one or more processors 208 and memory 210 storing instructions (e.g. program code) which when executed by the processor(s) 208 causes the system 202 to manage data for a business or entity, provide functionality to the one or more computing devices 204 and/or to function according to the described methods. The processor(s) 208 may comprise one or more microprocessors, central processing units (CPUs), application specific instruction set processors (ASIPs), application specific integrated circuits (ASICs) or other processors capable of reading and executing instruction code.

Memory 210 may comprise one or more volatile or non-volatile memory types. For example, memory 210 may comprise one or more of random access memory (RAM), read-only memory (ROM), electrically erasable programmable read-only memory (EEPROM) or flash memory. Memory 210 is configured to store program code accessible by the processor(s) 208. The program code comprises executable program code modules. In other words, memory 210 is configured to store executable code modules configured to be executable by the processor(s) 208. The executable code modules, when executed by the processor(s) 208 cause the system 202 to perform certain functionality, as described in more detail below.

The system 202 further comprises a network interface 212 to facilitate communications with components of the communications system 200 across the communications network 206, such as the computing device(s) 204, database 214 and/or other servers 216. The network interface 212 may comprise a combination of network interface hardware and network interface software suitable for establishing, maintaining and facilitating communication over a relevant communication channel.

The computing device(s) 204 comprise one or more processors 218 and memory 220 storing instructions (e.g. program code) which when executed by the processor(s) 218 causes the computing device(s) 204 to cooperate with the system 202 to provide functionality to users of the computing device(s) 204 and/or to function according to the described methods. To that end, and similarly to the system 202, the computing devices 204 comprise a network interface 222 to facilitate communication with the components of the communications network 206. For example, memory 220 may comprise a web browser application (not shown) to allow a user to engage with the system 202.

The computing device 206 comprises a user interface 224 whereby one or more user(s) can submit requests to the computing device 316, and whereby the computing device 206 can provide outputs to the user. The user interface 224 may comprise one or more user interface components, such as one or more of a display device, a touch screen display, a keyboard, a mouse, a camera, a microphone, buttons, switches and lights.

The communications system 200 further comprises the database 214, which may form part of or be local to the system 202, or may be remote from and accessible to the system 202. The database 214 may be configured to store data and records associated with entities having user accounts with the system 202, availing of the services and functionality of the system 202, or otherwise associated with the system 202. For example, where the system 202 is an accounting system, the data and/or records may comprise business records, banking records, accounting documents and/or accounting records.

The system 202 may also be arranged to communicate with third party servers or systems (not shown), to receive records or documents associated with data being monitored by the system 202. For example, the third party servers or systems (not shown), may be financial institute server(s) or other third party financial systems and the system 202 may be configured to receive financial records and/or financial documents associated with transactions monitored by the system 202. For example, where the system 202 is an accounting system 202, it may be arranged to receive bank feeds associated with transactions to be reconciled by the accounting system 202.

Memory 210 comprises an entity matching engine 226, which when executed by the processors(s) 208, causes the system 202 to match candidate entities with target entities based on entity attributes, with a view to providing one or more suggested target entities to a user, via user interface 324, to allow the user to identify one or more suitable target entities with which to work with, as discussed in more detail below. The entity matching engine 226 may be a rules-based engine, configured to execute one or more business rules to perform the entity matching functionality. The business rules may be stored in database 214 and may be reconfigurable as required to cater for specific candidate and/or target entities. The entity matching engine 226 comprises a target suitability measure module 228 and/or a candidate suitability measure module 230.

The target suitability measure module 228 is configured to determine a target suitability measure by determining target suitability value(s) for the desired target entity attribute(s) of the candidate entity based on the target entity attribute(s) (and in some cases metrics associated with the target entity attribute(s)) of corresponding target entity attribute type(s) associated with the target entity. In other words, the target suitability value may be indicative of, or a metric of, a target entity attribute of a target entity relative to a desired target entity attribute of a candidate entity. For example, the target suitability value may be indicative of the nearness of a target entity's physical location to the physical location of the candidate entity, or may be indicative of a percentage of the target entity's client base that is in the same industry as the candidate entity. In some embodiments, determined target suitability value(s) for a target entity are ranked relative to target suitability value(s) for corresponding target attribute types of other potential target entities within a dataset or "pool" of potential target entities to determine target suitability score(s). In these cases, the target suitability measure is based on the determined target suitability score(s), and may, for example, be a sum of the target suitability score(s) or weighted target suitability score(s). The target suitability score(s) for each entity attribute may be a value or number within a given range. The range may be from 0 to 1.

For example, where the desired target entity attribute for target attribute type "Location #1" is the geolocation for Melbourne, the target suitability measure module 228 may determine the geolocation or distance of the geolocation from Melbourne of the corresponding target entity attribute as being the target suitability value, and may determine the rank or ordered number of the determined target suitability value relative to the target suitability values of other potential target entities in the pool as the target suitability score. For example, the target suitability value may be 5 km and the target suitability score may be 0.78, meaning that it is not the highest scoring target entity in the pool for this entity attribute. For some entity attributes, such as "Location #2", the target suitability value may be determined as being or indicative of a density estimation of contacts (for example, clients) of a potential target entity being in or near the location of "Location #1" and the target suitability score may be indicative of the density estimation of contacts of the potential target entity being in or near the location relative to respective densities of contacts of other target entities of the pool. For example, the target suitability score may be a rank or order of most appropriate match of the target suitability value within the target suitability values of the pool of target entities. As another example, where the desired target entity attribute for target attribute type "Location #2" is the geolocation for Melbourne, the corresponding target entity attribute value may be a metric associated with the target entity attribute of the geolocation for Melbourne, and may for example, be a percentage or fraction of the clients of the target entity that are within 50 km of the geolocation for Melbourne. However, the target entity attribute score may be a ranking of the metrics relative to corresponding metrics in the pool of potential target entities.

For example, consider a potential target entity #1 which has 100 contacts located on a sliding score of geographical distance to "Location #2". If this potential target entity has the highest location score (i.e., target suitability value) in the pool of potential target entities, it will be allocated a target suitability score of 1. If a second target entity #2 which has 100 contacts located on a sliding score of geographical distance to "Location #2", has a lower proportion of its clients in the proximity of "Location #2", it would be allocated a lower location score (i.e., target suitability value) than entity #1. It would then also be allocated a target suitability score less than that of target entity #1. In some embodiments, the lowest location score (i.e., target suitability value) in the pool of potential target entities would need to be determined to ascertain the target suitability score of target entity #2 relative to the highest target suitability value, which would have a target suitability score of 1 (in this case target entity #1) and the lowest target suitability value, which would have a target suitability score of 0.

As yet another example, where the desired target entity attribute for target attribute type "Industry" is "hospitality", the target suitability value of a particular target entity may be a metric associated with a target entity attribute "hospitality", and may, for example, be a percentage or fraction of the clients of the target entity that are in the hospitality industry. This information may be determined from user input, or may be derived from information accessible to the system about the target entity's contacts or clients (which may be defined as a specific type of contact). Again, the target entity attribute score may be a ranking of the metrics relative to corresponding metrics in the pool of potential target entities.

It is recognised that, particularly where it is possible for desired target entity attributes (or desired candidate entity attributes) to be provided in free form text, there may be situations where the desired entity attributes are misspelt or not syntactically equivalent to target or candidate entity attributes associated with particular candidate or target entities. For example, a user associated with a candidate may indicate that the desired target entity attribute for target entity attribute type "Industry" is "restaurant", whereas the corresponding entity attribute that the system 202 associates with candidate or target entities may be "hospitality". In some embodiments, the system 202 is configured to tokenise a data string of an entity attribute prior to attempting to determine entity attributes. An example of a suitable data string analyser is the Standard Analyzer provided by Elasticsearch B.V. (https://www.elastic.co/guide/enlelasticsearch/reference/current/array.html.). In some embodiments, the system 202 may store a library comprising a dictionary or thesaurus of alternative words that may be provided by a candidate entity for different entity attribute types, and which may be accessed by the system 202 when attempting to match entity attributes.

In some embodiments, the target suitability measure module 228 determines a candidate entity weight for each of the one or more desired target entity attribute types, the candidate entity weight being indicative of the relative importance to the candidate entity of the target entity attribute type in a target entity. One or more of the candidate entity weights may be the same or different. The target suitability measure module 228 may determine the target suitability measure as a function of the target suitability value(s) and/or target suitability score(s), or as a function of the weighted target suitability value(s) and/or target suitability score(s). In some embodiments, a single candidate entity weight is applied to the determined target suitability measure, as opposed to applying individual weights to each of the one or more the target suitability values.

The candidate suitability measure module 230 is configured to determine a target suitability measure by determining candidate suitability value(s) for the desired candidate entity attribute(s) of the target entity based on the candidate entity attribute(s), of corresponding candidate entity attribute type(s) associated with the candidate entity. In other words, the candidate suitability value may be indicative of, or a metric of, a candidate entity attribute of a candidate entity relative to a desired candidate entity attribute of a target entity. For example, the candidate suitability value may be indicative of a percentage of the target entity's clients that are the same or a similar size to the size of the candidate entity. The candidate suitability value(s) for each entity attribute may be a value or number within a given range. The range may be from 0 to 1. In some embodiments, determined candidate suitability value(s) of a candidate entity with respect to a particular potential target entity are ranked relative to candidate suitability value(s) for corresponding candidate attribute types associated with other potential target entities within the dataset or "pool" of potential target entities to determine candidate suitability score(s). In these cases, the candidate suitability measure is based on the determined candidate suitability score(s), and may, for example, be a sum of the candidate suitability score(s) or weighted candidate suitability score(s). In other words, the candidate entity attribute score may be a ranking of the metrics relative to corresponding metrics in the pool of potential target entities.

The desired candidate entity attribute(s) of the target entity may be determined from the target entity, or a user associated with the target entity, or may be inferred from entity attributes of contacts of the target entity. For example, it may be assumed that the target entity would like to be matched with candidate entities that have entity attributes similar to those of the client of the target entity's practice.

For example, where the desired candidate entity attribute for candidate attribute type "Turnover" is an annual turnover band of less than AUD$1,000,000, and the corresponding candidate entity attribute is also an annual turnover band of less than AUD 1,000,000, the candidate suitability measure module 230 may determine candidate suitability value for candidate attribute type "Turnover" as "1". However, if the desired candidate entity attribute for target attribute type "Turnover" is an annual turnover of greater than AUD 20,000,000, the candidate suitability measure module 230 may determine the candidate suitability value for candidate attribute type "Turnover" to be "0". As another example, where the desired candidate entity attribute for candidate attribute type "Location #1" is the geolocation for Melbourne, but the corresponding candidate entity attribute is the geolocation of Ballarat or distance of the geolocation (Ballarat) from Melbourne, the candidate suitability measure module 230 may determine the candidate suitability value as the distance of the geolocation (Ballarat) from Melbourne, and determine the rank or ordered number of the determined candidate suitability value relative to the candidate suitability values associated with other potential target entities in the pool as the candidate suitability score. For example, the candidate suitability value may be 5 km and the candidate suitability score may be 1, meaning that it is the highest scoring target entity in the pool for this entity. Other candidate entity attribute values and scores may be determined in a similar manner to those examples provided above for target entity attribute values and/or scores.

In some embodiments, the candidate suitability measure module 228 determines a target entity weight for each of the one or more desired candidate entity attribute types, the target entity weight being indicative of the relative imporᵗance to the target entity of the candidate entity attribute type in a candidate entity. One or more of the target entity weights may be the same or different. The candidate suitability measure module 230 may determine the candidate suitability measure as a function of the candidate suitability value(s) and/or the candidate suitability score(s), or as a function of the weighted candidate suitability value(s) and/or the weighted candidate suitability score(s). In some embodiments, a single target entity weight is applied to the determined candidate suitability measure, as opposed to applying individual weights to each of the one or more the candidate suitability values.

In some embodiments, desired target entity attributes and/or desired candidate entity attributes may be flagged as essential to the respective candidate entity and/or target entity. Where specific entity attributes are flagged as being essential, only target entities, and/or candidate entities having the essential entity attribute will be considered when determining suggested target entities for matching with a candidate entity. For example, the target suitability measure module 228 may filter out any target entity that does not comply with, or have, the essential entity attribute. Similarly, the candidate suitability measure module 230 may filter out any target entity for which the candidate entity does not comply with, or have, the target entity's essential desired candidate entity attribute. In some embodiments, such essential entity attributes types may have binary suitability values. For example, entity attributes types such as professions (such as accountant or bookkeeper), certifications (such as payroll, advisor or migration), and/or services (such as reconciliation, tax, or advisory) provided may be flagged as essential entity attributes types, where the value of the associated entity attribute is either 0 or 1.

The entity matching engine 225 is configured to determine a matching score for each candidate entity target entity pair based on at least the determined target similarity measure, and in some embodiments, based on both the determined target similarity measure and the determined candidate similarity measure, as discussed in more detail below with reference to FIG. 3.

Figure 3:
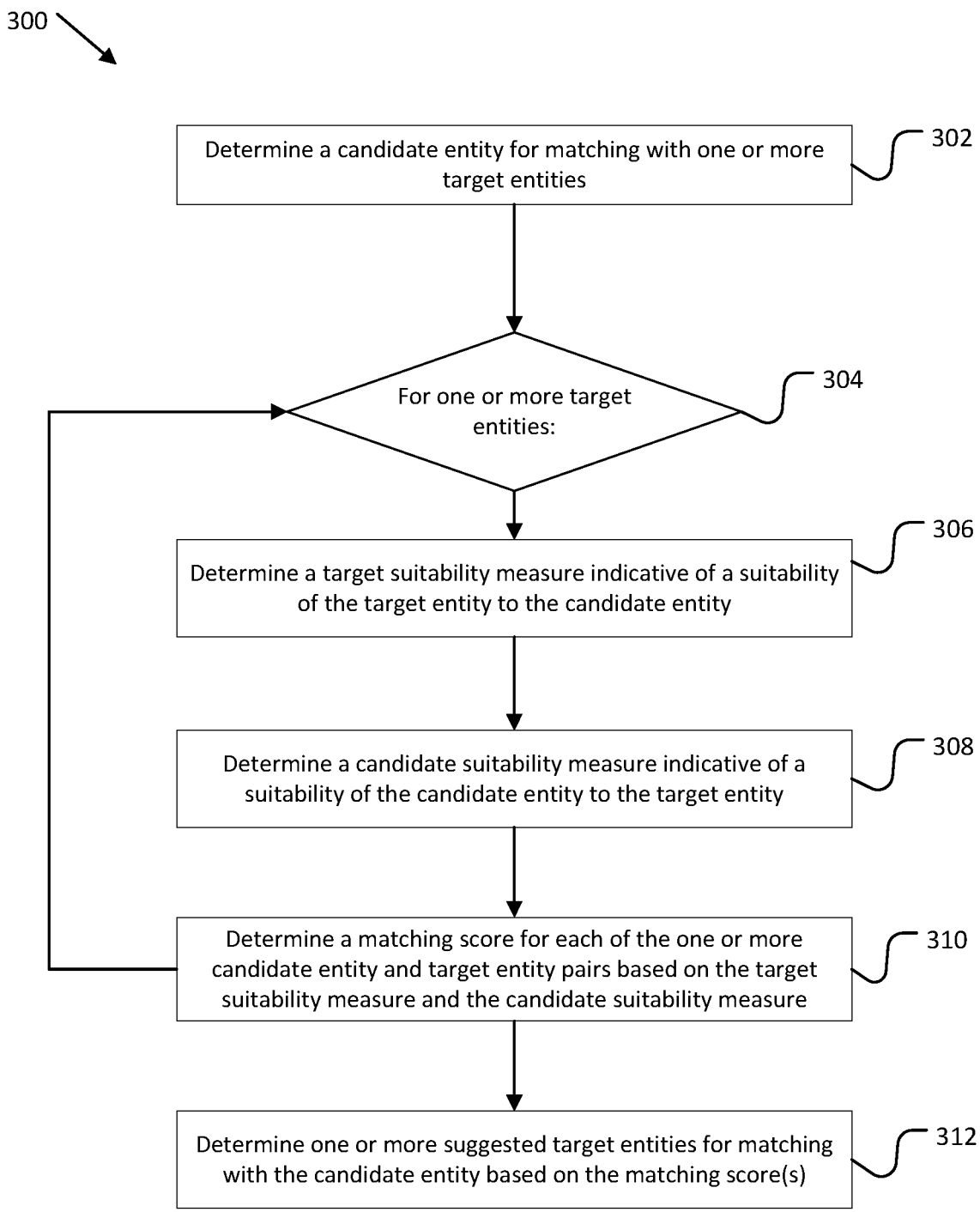
FIG. 3 is a process flow diagram of a method of determining suggested target entities for matching with a candidate entity, according to some embodiments.

Referring now to FIG. 3, there is illustrated a process flow of a method 300 for determining one or more suggested target entities for matching with a candidate entity. In some embodiments, the process may be implemented or performed by a system, such as a system 202 (for example, an accounting system) of FIG. 2.

At 302, the system 202 determines a candidate entity for matching with one or more target entities. In some embodiments, the system 202 receives a request from a user associated with the candidate entity, for example, via a user interface deployed on a computing device, such as computing device 204 of FIG. 2. For example, the request may be to provide one or more suggestions of entities having particular attributes, such as an accounting firm with expertise in family trusts and located in Sydney.

As indicated at 302, in order to determine suitable recommendations, the system performs steps 306 to 310 for one or more target entities, which may be possible appropriate matches for matching with the candidate entity. The target entities may form a "pool" or dataset of potential target entity matches for the candidate entity. In some embodiments, data relating to each target entity, such as attribute types, attributes and values is extracted from a database, such as database 214, and pre-processed.

At 304, the system 202 determines a target suitability measure indicative of a suitability of each target entity to the candidate entity. The system 202 may determine the target suitability measure based on one or more desired target entity attributes of the candidate entity and corresponding one or more target entity attributes associated with the target entity. In some embodiments, the system 202 may further determine the target suitability measure based on metrics of respective target entity attributes.

The one or more target entity attribute types may include any one or more of: (i) industry; (ii) location; (iii) experience with a particular type of business; (iv) experience with a particular type of technology; (v) certification or authorisation; (vi) experience with stage of business; and (vii) experience with type of work. Multiple entity attributes for any one attribute type may be provided. For example, two target entity attributes may be provided or determined for the target entity attribute type "location"; that is, the location of the main office or any office of the target entity, and location of clients the target entity has experience working with, which may be indicative of the expertise of the target entity working in those locations. For example, a target entity may have an office in Sydney, but has a large number of contacts of other clients based in Perth.

In some embodiments, the system 202 determines the desired target entity attribute(s) of the candidate entity from information provided by the candidate entity, or user associated with the candidate entity. FIG. 7 is an example form 700 which may be displayed on a user interface of a computing device associated with the candidate entity, and via which a user can provide one or more desired target entity attributes for one or more target entity attribute types.

In some embodiments, the system 202 determines or infers the desired target entity attribute(s) and/or metrics of desired target entity attribute(s) of the candidate entity from candidate entity attributes of candidate entity attribute type corresponding to the one or more respective target entity attribute type. For example, a desired target entity attribute for the type "location" may be inferred as being the same location as that of the candidate entity; i.e., the candidate entity is seeking a target entity in its location.

The system 202 may determine the one or more target entity attributes associated with the target entity from a database, such as database 214 of FIG. 2. The database 214 may be a database of an accounting platform system configured to maintain accounting records for the target entity, such as an accounting system. In some embodiments, one or more of the target entity attributes may be target entity attributes directly associated with the target entity, such as a location of a main premises of the target entity, or a number of employees. Alternatively, or in addition, one or more of the target entity attributes may be derived or inferred from information about the target entity's contacts, such as clients, customers and/or providers. In some embodiments, the system 202 may be configured to identify one or more contacts associated with the target entity, for example using network data of the system 202, and to determine one or more contact attributes of the identified one or more contacts. The system 202 may then determine the target entity attribute(s) associated with the target entity based on the determined contact attribute(s) of the identified contact(s). For example, if a majority of the contacts of a target entity are in a particular industry, the system 202 may determine that the target entity has expertise in servicing clients in that industry.

In some embodiments, the determines the target suitability measure by performing the steps of process 400 illustrated in FIG. 4, as discussed in more detail below.

At 306, the system 202 determines a candidate suitability measure indicative of a suitability of the candidate entity to the target entity. The system 202 may determine the candidate suitability measure based on one or more desired candidate entity attributes of the target entity and corresponding one or more candidate entity attributes associated with the candidate entity. In some embodiments, the system 202 may further determine the candidate suitability measure based on metrics of respective desired candidate entity attributes.

The one or more candidate entity attribute types may include any one or more of: (i) location; (ii) turnover; (iii) size of business; (iv) number of staff; (v) type of business; (vi) stage of business; (vii) experience with a particular type of technology; and (viii) type of work candidate entity is likely to need assistance with. Similar to the target entity attributes, multiple entity attributes may be provided or determined for any one attribute type In some embodiments, the system 202 determines the desired candidate entity attributes of a target entity based on corresponding contact attributes of the identified one or more contacts. In other words, the system 202 may infer that if contacts or clients of the target entity have a particular entity attribute, that entity attribute is likely to be a desired candidate entity attribute for the target entity. In some embodiments, a user associated with a target entity may provide the desired candidate entity attributes, for example, via a user interface deployed on a computing device 204 associated with the target entity.

In some embodiments, the system 202 determines the one or more candidate entity attributes associated with the candidate entity from a database, such as database 214 of FIG. 2. The database may be a database 214 of an accounting platform system configured to maintain accounting records for the candidate entity, such as an accounting system. In other embodiments, the system 202 may determine candidate entity attribute(s) via user input from a user associated with the candidate entity, for example, via a form. In some embodiments, the system 202 may determine, infer or derive candidate entity attribute(s) from entity attributes of contact entities identified as being associated with the candidate entity, for example in the system 202.

In some embodiments, the system 202 determines the candidate suitability measure by performing the steps of process 500 illustrated in FIG. 5, as discussed in more detail below.

At 310, the system 202 determines a matching score for the candidate entity and target entity pair as a first function of the target suitability measure and the candidate suitability measure. For example, the first function may be summation, and the system 202 may determine the matching score for the pair as the sum of the target suitability measure and the candidate suitability measure.

At 312, the system 202 determines one or more suggested target entities for matching with the candidate entity based on the matching score for each candidate entity and target entity pair.

In some embodiments, the system 202 determines an ordered list of the of one or more matching scores and determines from the ordered list, the one or more suggested target entities for matching with the candidate entity.

In some embodiments, the system 202 may send or transmit to a computing device associated with the candidate entity, such as computing device 2020, the one or more suggested target entities. The system 202 may be configured to cause the computing device 204 to display, on a user interface of the computing device, the one or more suggested target entities, as exemplified in FIG. 8.

The suggested target entities may be displayed in respective user interface objects 802. The user interface objects 802 may provide details of the suggested target entity such as an identifier, name, location, profession, and may provide information relating to the matching score. In some embodiments, the user interface objects 802 may provide details of the candidate suitability measure and/or target suitability measure, such as the candidate suitability values and/or target suitability values for candidate attribute types and/or target attribute types.

The user interface 800 may provide a user selectable option for allowing the user to select one or more of the one or more suggested target entities ("Get in touch" button 804, FIG. 8). In some embodiments, in response to receiving a user selection of one of the suggested target entities, the system automatically generates an email or other electronic communication (e.g., an electronic communication message), for transmitting to the selected suggested target entity. The communication may be prepopulated with data associated with the candidate entity, and the matching score, and/or may include an identified or the target entity, such as an email address or phone number. The user interface 800 may provide an option 804 to allow the user to consider further information about the suggested target entities, such as an overview of their expertise and/or client base.

In some embodiments, the system 202 sends or transmits to a computing device associated with a respective one of the one or more suggested target entities, a notification identifying the candidate entity as a potential match, and optionally, the matching score for the candidate entity target entity pair.

Figure 4:
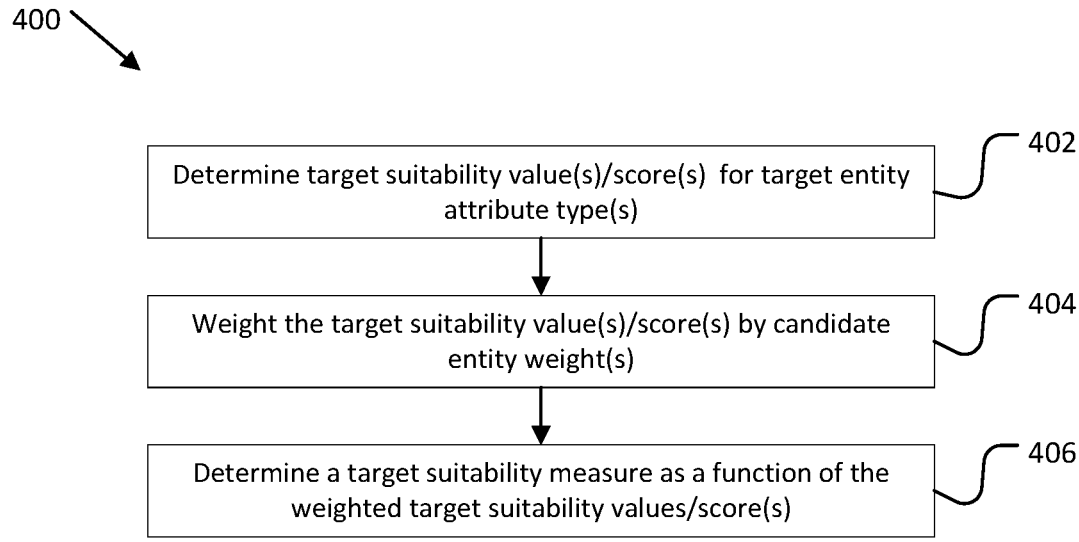
FIG. 4 is a process flow of a method of determining a target suitability measure of a candidate entity target entity pair, according to some embodiments.

Referring now to FIG. 4, there is shown a process flow diagram of a method 400 of determining a target suitability measure, i.e., the suitability of the target entity for the candidate entity. As indicated above, the method 400 may correspond to step 306 of FIG. 3, in some embodiments. Method 400 may be performed for each of the one or more target entities. Again, method 400 may be implemented or performed by a system, such as the system 202 (for example, an accounting system) of FIG. 2.

At 402, the system 202 determines one or more target suitability values for each of one or more target entity attribute types. The system 202 determines the target suitability value(s) based on one or more desired target entity attributes of target entity attribute type(s) of the candidate entity and one or more target entity attributes (and/or associated metrics) of corresponding target entity attribute type (s) associated with the target entity. For example, the system 202 may determine one or more target suitability values for each of one or more target entity attribute types as metrics of the one or more target entity attributes of target entity attribute types relative to the one or more desired target entity attributes of the one or more corresponding target entity attribute types.

In some embodiments, for each of the one or more desired target entity attributes of the candidate entity, the system 202 determines a number or count of contacts of the potential target entities (for example, in a dataset or "pool" of target entities) that meet or have a value for the desired target entity attribute. In some embodiments, a scale or weighting is applied or assigned to the target entity attribute value associated with the determined contacts. For example, in some embodiments, specific entity attribute types may be associated with a number of hierarchical levels or tiers, each of which may be allocated a weighting in terms of importance or relevance. For example, entity attributes for the entity attribute type "Industry" may have four tiers of sub-type, for example, as may be based on ANZSIC codes. This allows for candidate entity target entity pair matching based on sub-types, such as their Division level Industry (Construction), all the way down to their class (House Construction).

The system 202 may limit the number of contacts of a potential target entity that are to be considered, and any such count thresholds may be entity attribute type specific. For example, a maximum count threshold of 30 may be deemed appropriate for entity attribute type "Industry".

For each contact of the target entity to be considered for a particular target entity attribute, the system 202 determines a contact suitability value, for example by comparing the desired target entity attribute of an attribute type with the corresponding contact entity attribute of the corresponding type. For example, the contact suitability value may be a metric indicative of an attribute of the contact relative to the desired target entity attribute, such as a distance of the contact from a specific geolocation (i.e., that of the desired target entity attribute).

The system 202 may determine a density estimation of the contact suitability values for the selected clients of the target. In some embodiments, a minimum threshold of contacts is selected, and the minimum threshold may be entity attribute type specific. For example, a minimum threshold of 5 may be deemed appropriate for entity attribute type "Industry". The system 202 may determine a density score indicative of the density estimations for the target entity attribute for the target entity.

The system 202 may determine the target suitability value for the target entity attribute for the target entity as a function of the density score and the number of contact attributes based on which the density score was derived. In some embodiments, weighting(s) may be applied to the target suitability value at this stage, as discussed above.

This can be advantageous in normalising suitability relative to the size of a target firm. For example, a large target entity may have a high absolute number of contacts in a particular industry, but this may be a small proportion of their overall number of contacts, and thus may be less indicative of their particular specialisation. In contrast, a small target entity may have a lower absolute number of contacts in the particular industry, but this may form the majority of their contacts, and therefore may be more indicative of their specialisation.

The target suitability value may then be ranked relative to the target suitability values for the corresponding target entity attribute type of the other target entities in the target entity pool to determine target suitability scores. For example, the system 202 may determine a minimum target suitability value and a maximum target suitability value, and assign them target suitability scores of 0 and 1, respectively. All other target suitability values are assigned a target suitability score of between 0 and 1.

In some embodiments, the system 202 determines a candidate entity weight for each of the one or more target entity attribute types, the candidate entity weight being indicative of the relative importance to the candidate entity of the target entity attribute type in a target entity. Accordingly, in some embodiments, at 404, the system 202 weights each of the one or more target suitability values by the respective one or more candidate entity weights. In some embodiments, at 404, the system 202 weights each of the one or more target suitability scores by the respective one or more candidate entity weights.

At 406, the system 202 determines the target suitability measure as a function of the target suitability value(s) or target suitability score(s), or as a function of the weighted target suitability value(s) or target suitability score(s). For example, the function may be summation and the system 202 may sum the target suitability value(s) or score(s), or the weighted target suitability value(s) or score(s), together to determine the target suitability measure.

Figure 5:
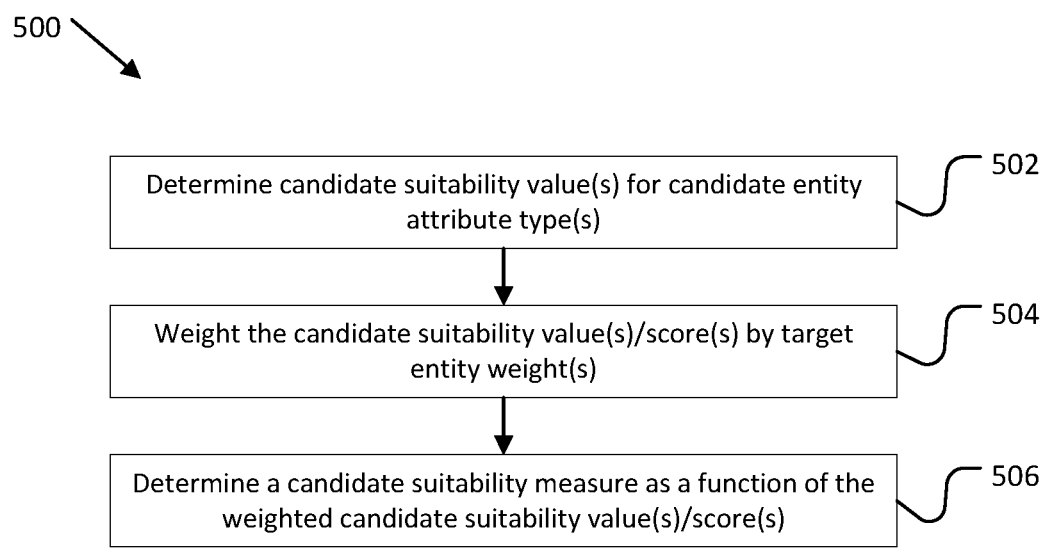
FIG. 5 is a process flow of a method of determining a candidate suitability measure of a candidate entity target entity pair, according to some embodiments.

Referring now to FIG. 5, there is shown a process flow diagram of a method 500 of determining a candidate suitability measure, i.e., the suitability of the candidate entity for the target entity. As indicated above, the method 500 may correspond to step 308 of FIG. 3, in some embodiments. Method 500 may be performed for each of the one or more target entities. Again, method 500 may be implemented or performed by the system 202 of FIG. 2, such as an accounting system.

At 502, the system 202 determines one or more candidate suitability values for each of one or more candidate entity attribute types. The system 202 determines the candidate suitability value(s) based on one or more desired candidate entity attributes (and/or associated metrics) of candidate entity attribute type(s) of the target entity and one or more candidate entity attributes of corresponding candidate entity attribute type(s) associated with the candidate entity. For example, the system 202 may determine the one or more candidate suitability values for each of one or more candidate entity attribute types as metrics of the one or more desired candidate entity attributes of the one or more candidate entity attribute types relative to respective one or more candidate entity attributes of corresponding candidate entity attribute types.

The system 202 may determine the candidate suitability value for each candidate entity attribute type by comparing one or more desired candidate entity attributes of the type with the candidate attribute of the corresponding type. In some embodiments, the candidate suitability value is a fraction of contacts of the target entity having an entity attribute that is the same as or similar to the candidate entity attribute. In some embodiments, the system 202 may determine the candidate suitability values and/or candidate suitability scores in a similar manner to that described above with respect to the target suitability values and target suitability scores.

In some embodiments, the system 202 determines a target entity weight for each of the one or more candidate entity attribute types, the target entity weight being indicative of the relative importance to the target entity of candidate entity attribute type in a candidate entity. Accordingly, in some embodiments, at 504, the system 202 weights each of the one or more candidate suitability values by the respective one or more target entity weights. In some embodiments, at 404, the system 202 weights each of the one or more candidate suitability scores by the respective one or more target entity weights.

At 506, the system 202 determines the candidate suitability measure as a function of the candidate suitability value(s) or candidate suitability score(s), or as a function of the weighted candidate suitability value(s) or weighted or candidate suitability score(s). For example, the function may be summation and the system 202 may sum the candidate suitability value(s) or candidate suitability score(s), or the weighted candidate suitability value(s) or weighted or candidate suitability score(s), together to determine the candidate suitability measure.

Figure 6:
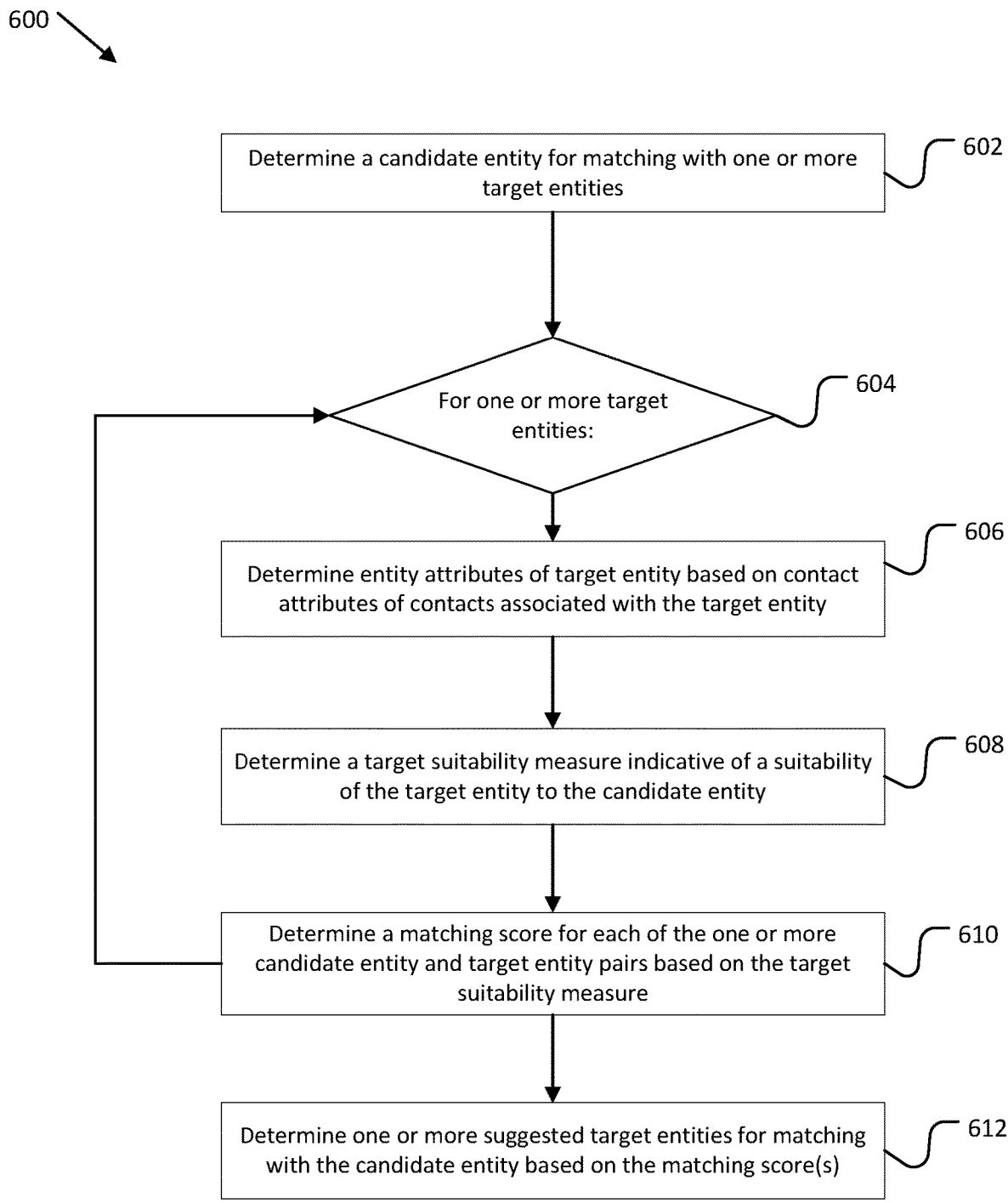
FIG. 6 is another process flow diagram of a method of determining suggested target entities for matching with a candidate entity, according to some embodiments.

Referring now to FIG. 6, there is illustrated a process flow of an alternative method 600 for determining one or more suggested target entities for matching with a candidate entity. In some embodiments, the process may be implemented or performed by the system 202 of FIG. 2, such as an accounting system.

Steps 602, 604, 608 and 612 of method 600 correspond with steps 602, 604, 606 and 612, respectively of FIG. 3. Most notably, method 600 does not require that the system 202 determine candidate suitability measure, and accordingly, the matching score does not necessarily take into account or depend on the candidate suitability measure.

At 606 of method 600, the system 202 determines one or more entity attributes of the target entity based on contact attributes of contacts associated with the target entity. For example, the system 202 may identify one or more contacts associated with the target entity, for example using network data of the system 202, determine one or more contact attributes of the identified one or more contacts. The system 202 may infer or determine the target entity attribute(s) based on the determined contact attribute(s) of the identified contact(s). The system 202 may determine information about the target entity, contacts of the target entity and contact attributes of the contacts associated with the target entity from a database, such as database 214 of FIG. 2. Database 214 may be a database of an accounting platform system configured to maintain accounting records for the target entity, such as an accounting system.

At 610, the system 202 determines the matching score for each candidate entity-target entity pair based on the target suitability measure. This contrasts with step 310 of method 300, in which the system 202 determines the matching score for each candidate entity target entity pair based on both the target suitability measure and the candidate suitability measure.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

The invention claimed is:

1. A computer-implemented method, performed by an accounting system, the method comprising:
identifying a candidate entity for matching with one or more target entities from a plurality of target entities;
receiving, from a user interface associated with the candidate entity, desired target entity attributes; and
for one or more of the target entities:
identifying, from a database of the accounting system, one or more contacts associated with the target entity;
determining one or more contact attributes of the identified one or more contacts;
determining one or more target entity attributes associated with the target entity based on the determined one or more contact attributes of the identified one or more contacts;
determining a target suitability measure indicative of a suitability of the target entity to the candidate entity based on one or more desired target entity attributes of the candidate entity and corresponding one or more target entity attributes of the one or more target entity attributes associated with the target entity;
determining a candidate suitability measure indicative of a suitability of the candidate entity to the target entity based on the one or more desired candidate entity attributes of the target entity and corresponding one or more candidate entity attributes associated with the candidate entity;
determining a matching score for the candidate entity and target entity pair as a first function of the target suitability measure and the candidate suitability measure;
determining one or more suggested target entities for matching with the candidate entity based on the matching score for each candidate entity and target entity pair; and
displaying, on a user interface associated with the candidate entity, the one or more suggested target entities, the user interface comprising a user selectable option;
receiving, via the user selectable option, a selection of at least one of the suggested target entities; and
responsive to receiving via the user selectable option, the selection of the at least one of the suggested target entities:

generating an electronic communication message, for transmitting to the at least one suggested target entity, the electronic communication message pre-populated with data associated with the candidate entity; and
transmitting the electronic communication message to a computing device associated with the at least one suggested target entity.

2. The method of claim 1, further comprising:
determining the one or more candidate entity attributes associated with the candidate entity from a database of an accounting platform system, the accounting platform system being configured to maintain accounting records for the candidate entity.

3. The method of claim 1, wherein determining the candidate suitability measure comprises:
determining one or more candidate suitability values for each of one or more candidate entity attribute types, wherein the one or more candidate suitability values are metrics of the one or more desired candidate entity attributes of the one or more candidate entity attribute types relative to respective one or more candidate entity attributes of corresponding candidate entity attribute types; and
determining the candidate suitability measure as a second function of one or more target suitability values.

4. The method of claim 3, further comprising:
for each one of the one or more target entities:
determining a target entity weight for each of the one or more candidate entity attribute types, the target entity weight being indicative of a relative importance to the target entity of candidate entity attribute type in a candidate entity;
weighting each of the one or more candidate suitability values by the respective one or more target entity weights; and
determining the candidate suitability measure as the second function of the one or more weighted candidate suitability values.

5. The method of claim 3, further comprising:
wherein determining the candidate suitability measure comprises:
determining one or more candidate suitability scores for each of one or more candidate entity attribute values, wherein the one or more candidate suitability scores are indicative of a rank of the candidate entity attribute value relative to candidate entity attribute values of corresponding candidate entity attribute associated with others of the plurality of target entities; and
determining the candidate suitability measure as a third function of the one or more candidate suitability scores.

6. The method of claim 5, further comprising:
for each one of the one or more target entities:
determining a target entity weight for each of the one or more candidate entity attribute types, the target entity weight being indicative of a relative importance to the target entity of candidate entity attribute type in a candidate entity;
weighting each of the one or more candidate suitability scores of the by the respective one or more target entity weights; and
determining the candidate suitability measure as the second function of the one or more weighted candidate suitability scores.

7. The method of claim 3, wherein the candidate suitability value is a metric based at least in part on a density estimation value associated with a set of contacts of the target entity, and a number of contacts in the set.

8. The method of claim 1, further comprising:
for each of the one or more target entities:
determining the one or more desired candidate entity attributes based on corresponding contact attributes of the identified one or more contacts.

9. The method of claim 1, further comprising:
receiving, from a user interface of a computing device associated with the one or more target entities, the desired candidate entity attributes.

10. The method of claim 1, wherein determining the target suitability measure comprises:
determining one or more target suitability values for each of one or more target entity attribute types, wherein the one or more target suitability values are metrics of the one or more target entity attributes of target entity attribute types relative to the one or more desired target entity attributes of the one or more corresponding-target entity attribute types; and
determining the target suitability measure as a third function of the one or more target suitability values.

11. The method of claim 10, further comprising:
determining a candidate entity weight for each of the one or more target entity attribute types, the candidate entity weight being indicative of a relative importance to the candidate entity of the target entity attribute type in a target entity;
for each one of the one or more target entities:
weighting each of the one or more target suitability values by a respective one or more candidate entity weights; and
determining the target suitability measure as the third function of the one or more weighted target suitability values.

12. The method of claim 10, further comprising:
wherein determining the target suitability measure comprises:
determining one or more target suitability scores for each of one or more target entity attribute values, wherein the one or more target suitability scores are indicative of a rank of the target entity attribute value relative to target entity attribute values of corresponding target entity attributes associated with others of the plurality of target entities; and
determining the target suitability measure as a third function of the one or more target suitability scores.

13. The method of claim 12, further comprising:
for each one of the one or more target entities:
determining a candidate entity weight for each of the one or more target entity attribute types, the candidate entity weight being indicative of a relative importance to the target entity of target entity attribute type in a target entity;
weighting each of the one or more target suitability scores of the by the respective one or more candidate entity weights; and
determining the target suitability measure as a second function of the one or more weighted target suitability scores.

14. The method of claim 10, wherein the target suitability value is a metric based at least in part on a density estimation value associated with a set of contacts of the target entity, and a number of contacts in the set.

15. The method of claim 10, wherein the one or more desired target entity attributes for the one or more target entity attribute types are derived from candidate entity attributes of candidate entity attribute type corresponding to the one or more target entity attribute types.

16. The method of claim 1, wherein the one or more target entity attributes are indicative of respective one or more target entity attributes types and the one or more target entity attribute types comprises one or more of:
(i) industry;
(ii) location;
(iii) experience with a particular type of business;
(iv) experience with a particular type of technology;
(v) certification or authorisation;
(vi) experience with stage of business; and
(vii) experience with type of work.

17. The method of claim 1, wherein the one or more candidate entity attributes are indicative of respective one or more candidate entity attributes types and the one or more candidate entity attribute types comprises one or more of:
(i) location;
(ii) turnover;
(iii) size of business;
(iv) number of staff;
(v) type of business;
(vi) stage of business;
(vii) experience with a particular type of technology; and
(viii) type of work candidate entity is likely to need assistance with.

18. An accounting system comprising:
one or more processors;
a database; and
memory comprising computer executable instructions, which when executed by the one or more processors, cause the system to:
identify a candidate entity for matching with one or more target entities from a plurality of target entities;
receive, from a user interface associated with the candidate entity, desired target entity attributes; and
for one or more of the target entities:
identify, from the database, one or more contacts associated with the target entity;
determine one or more contact attributes of the identified one or more contacts;
determine one or more target entity attributes associated with the target entity based on the determined one or more contact attributes of the identified one or more contacts;
determine a target suitability measure indicative of a suitability of the target entity to the candidate entity based on one or more desired target entity attributes of the candidate entity and corresponding one or more target entity attributes of the one or more target entity attributes associated with the target entity;
determine a candidate suitability measure indicative of a suitability of the candidate entity to the target entity based on one or more desired candidate entity attributes of the target entity and corresponding one or more candidate entity attributes associated with the candidate entity;
determine a matching score for the candidate entity and target entity pair as a first function of the target suitability measure and the candidate suitability measure;

determine one or more suggested target entities for matching with the candidate entity based on the matching score for each candidate entity and target entity pair; and display, on the user interface associated with the candidate entity, the one or more suggested target entities, the user interface comprising a user selectable option;

receive, via the user selectable option, a selection of at least one of the suggested target entities; and responsive to receiving via the user selectable option, the selection of the at least one of the suggested target entities:

generate an electronic communication message, for transmitting to the at least one suggested target entity, the electronic communication message prepopulated with data associated with the candidate entity; and transmit the electronic communication message to a computing device associated with the at least one suggested target entity.

19. A non-transitory computer-readable storage medium storing instructions that, when executed by a computer, cause the computer to perform operations including:

identifying a candidate entity for matching with one or more target entities from a plurality of target entities;

receiving, from a user interface associated with the candidate entity, desired target entity attributes; and for one or more of the target entities:

identifying, from a database of an accounting system, one or more contacts associated with the target entity;

determining one or more contact attributes of the identified one or more contacts;

determining one or more target entity attributes associated with the target entity based on the determined one or more contact attributes of the identified one or more contacts;

determining a target suitability measure indicative of a suitability of the target entity to the candidate entity based on one or more desired target entity attributes of the candidate entity and corresponding one or more target entity attributes of the one or more target entity attributes associated with the target entity;

determining a candidate suitability measure indicative of a suitability of the candidate entity to the target entity based on one or more desired candidate entity attributes of the target entity and corresponding one or more candidate entity attributes associated with the candidate entity;

determining a matching score for the candidate entity and target entity pair as a first function of the target suitability measure and the candidate suitability measure;

determining one or more suggested target entities for matching with the candidate entity based on the matching score for each candidate entity and target entity pair; and displaying, on the user interface associated with the candidate entity, the one or more suggested target entities, the user interface comprising a user selectable option;

receiving, via the user selectable option, a selection of at least one of the suggested target entities; and responsive to receiving via the user selectable option, the selection of the at least one of the suggested target entities:

generating an electronic communication message, for transmitting to the at least one suggested target entity, the electronic communication message prepopulated with data associated with the candidate entity; and transmitting the electronic communication message to a computing device associated with the at least one suggested target entity.

* * * * *